COMPATIBLE SINGLE-SIDEBAND TRANSMISSION

Filed Aug. 8, 1960

3 Sheets-Sheet 1

INVENTORS B. F. LOGAN, JR.
M. R. SCHROEDER

BY G. E. Hirsch, Jr.

ATTORNEY

INVENTORS B. F. LOGAN, JR.
M. R. SCHROEDER
BY G. E. Hirsch, Jr.
ATTORNEY

COMPATIBLE SINGLE-SIDEBAND TRANSMISSION

Filed Aug. 8, 1960 3 Sheets-Sheet 3

INVENTORS B. F. LOGAN, JR.
M. R. SCHROEDER
BY G. E. Hirsch Jr.
ATTORNEY

United States Patent Office 3,085,203

Patented Apr. 9, 1963

3,085,203

COMPATIBLE SINGLE-SIDEBAND TRANSMISSION

Benjamin F. Logan, Jr., Summit, and Manfred R. Schroeder, Gillette, N.J., assignors to Bell Telephone Laboratories, Incorporated, New York, N.Y., a corporation of New York Filed Aug. 8, 1960, Ser. No. 48,253
8 Claims. (Cl. 325—50)

This invention relates to single-sideband systems and more particularly to apparatus and methods for the reduction of distortion in systems of this general type that employ envelope detection.

A suppressed-carrier single-sideband signal is not compatible with conventional amplitude modulation apparatus since the envelope of the single-sideband signal is not a faithful replica of the modulating signal. Thus, simple envelope detectors and the like used in conventional amplitude modulation (AM) receivers to recover the message wave from the transmitted signal cannot be employed to recover a single-sideband (SSB) signal. Instead the SSB signal must be translated down to its original position in the audio frequency spectrum by means of a locally generated carrier before the message information can be recovered; i.e., distortionless demodulation of conventional SSB signals requires a relatively complex receiver employing synchronous detection or the like. The problem of compatible single-sideband (CSSB) transmission thus becomes one of generating a signal containing no frequency components outside of a pass-band of width W but which nevertheless conveys an arbitrary message of bandwidth W that may be recovered without distortion by a receiver employing linear envelope detection.

To overcome at least to some extent this incompatibility, communication systems that seek to retain the advantages of SSB transmission but must, of necessity, rely on envelope detection, typically are arranged to radiate, in addition to one sideband, either a full or an exalted carrier signal. While this expedient is wasteful of power it nevertheless reduces the spectrum requirements and distortions due to envelope detection. In fact, linear envelope detection of an SSB signal with normal or "full" carrier present yields a signal deviating from the modulating information to a degree that can be tolerated in many speech communication systems; the residual distortion impairs the quality but not the intelligibility of speech. However, the residual distortion is quite undesirable in other applications, for example, in the commercial broadcasting of high fidelity program material or in the transmission of analog data, and is largely responsible for the absence of SSB services in these fields.

It is the principal object of the present invention to develop a single-sideband signal that may be received with a minimum of distortion by a receiver employing a linear envelope detector.

Various arrangements have been proposed for reducing or eliminating the distortions inherent in envelope detection of single-sideband signals. However, the envelope of an SSB signal is, in general, not band-limited and any attempt to eliminate all distortion in the envelope without increasing the bandwidth of the signal is a contradiction of established theory and therefore represents a futile effort. The apparent incompatibility of an SSB signal with linear AM detection is thus due, in part at least, to the incontrovertible fact that a signal having a band-limited envelope is equivalent to a double sideband signal. It is recognized in the present invention, however, that compatibility can be achieved despite the fact that an SSB envelope is not band-limited.

It is another object of the present invention to eliminate the undesirable effects of transmission distortion in a single-sideband transmission system employing envelope detection by selectively controlling the spectral distribution of distortion components.

In accordance with the present invention an SSB signal that is compatible with receivers employing envelope detectors is obtained by altering the modulating signal so that distortions of the desired message signal are made to consist entirely of frequency components outside the band of interest, i.e., outside the pass-band of the message wave, so that they may be removed following envelope detection by band-limiting the detected envelope as, for example, by filtering. This is accomplished by selectively shaping the message wave to produce a predistorted modulation signal that not only is band-limited but which has an envelope that yields, following envelope detection and band-limiting, a replica of the message signal. A band-limited modulation signal with the required attributes is, in accordance with the present invention, derived with an arbitrary degree of precision by iterative techniques.

The shaped or error correcting modulation signal thus replaces the message signal as the input to a conventional SSB generator. Since a normal function of an AM receiver is filtering of the detected output signal, recovery of the desired message by band-limiting the detected envelope does not impair the compatibility of the SSB signal.

The invention will be fully comprehended from the following detailed description of preferred embodiments thereof taken in connection with the appended drawings, in which.

In the interests of simplicity the circuit diagrams to be discussed are presented for the most part in block schematic form with single line paths directing the flow of energy and information to the several apparatus components which process it. It is to be understood that in practice each single line energy path will normally be actualized with two electric conductors one of which may in many cases be connected to ground.

Figure 1:
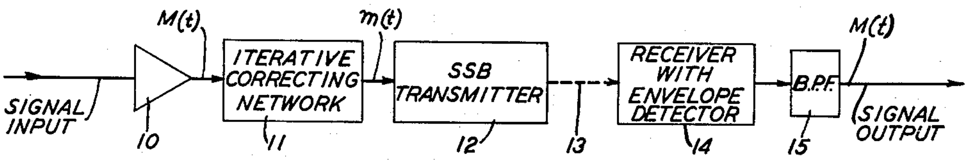
FIG. 1 is a block schematic diagram illustrating a full-carrier single-sideband transmission system embodying the present invention.

As shown in FIG. 1 a suppressed sideband transmission system may include an input amplifier 10 supplying message signal waves $M(t)$ to an error correcting network 11. The message wave is suitably shaped or predistorted in circuit 11 to produce at its output a modulation signal $m(t)$ that is suitable for producing, in single-sideband transmitter 12, a carrier wave accompanied by a single-sideband signal. The fully modulated signal is then transmitted via transmission path 13 to a conventional amplitude-modulation receiver 14 that includes an envelope detector. Without the signal shaping provided in apparatus 11 serious distortions would result from envelope detection of the single-sideband wave from transmitter 12. However, by the preshaping of the modulating wave in apparatus 11, the distortion components produced in the envelope detection operation are restricted to frequencies that fall outside of the pass-band of the message wave $M(t)$. These distortion components are removed by passing the detected envelope signal from detector 14 through filter 15 proportioned to pass the frequencies included in the message signal $M(t)$ inclusive. The resulting output signal constitutes a replica of the input message signal and may be used for any desired purpose.

Before entering upon a detailed description of the apparatus of the invention and of the fashion in which it operates, it is desirable to discuss certain mathematical relations some of which are instrumented by the apparatus shown in the drawings.

Figure 2:
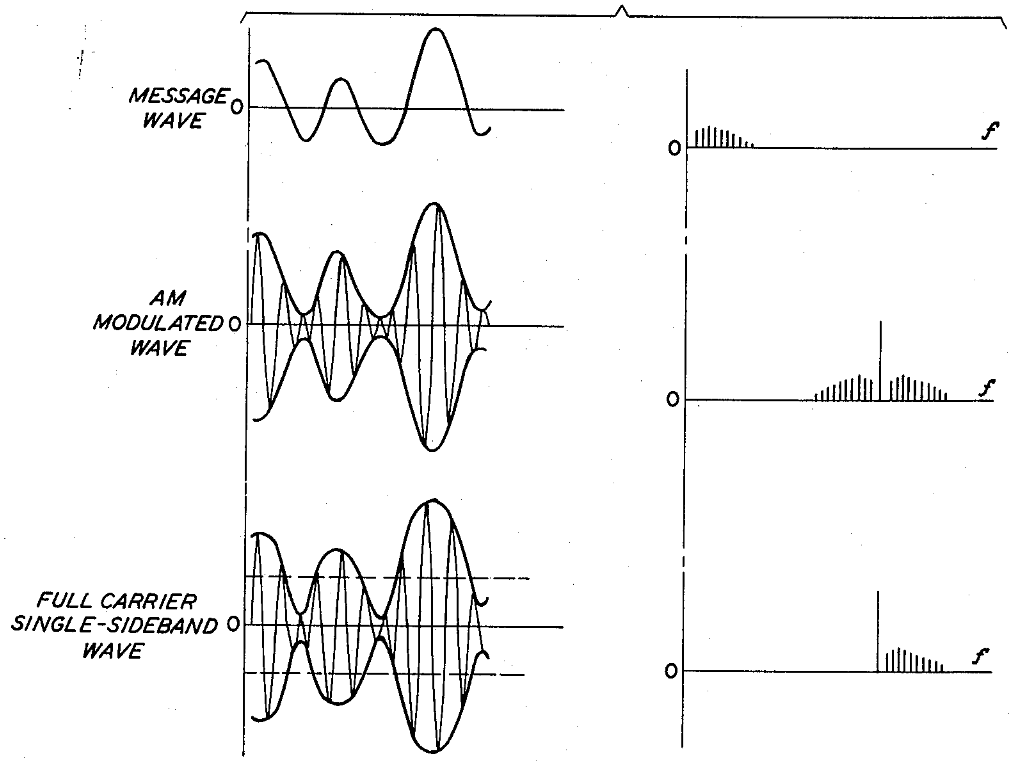
FIG. 2 is a sequence of curves helpful in understanding the principles of the invention.

In conventional single-sideband transmission a message signal is first modulated on a carrier wave creating a double-sideband signal, $$S(t)=[k+M(t)]\cos\omega_c t \qquad (1)$$

where $k$ represents the magnitude of the carrier wave, $M(t)$ denotes the wave form of the message signal, $\omega_c$ is the angular frequency of the carrier wave in radians per second and $t$ is time in seconds. A typical message wave $M(t)$ as a function of time and its frequency spectrum are shown by way of example in FIG. 2*a*. The resulting amplitude-modulated signal and its spectrum showing two identical sidebands similar to the spectrum of the original modulating signal centered about the carrier wave of frequency $f_c$ are illustrated in FIG. 2*b*. Subsequently one sideband, for example, the lower sideband, is suppressed either by filtering or cancellation to obtain a single-sideband signal $$F(t)=[k+M(t)]\cos\omega_c t-\hat{M}(t)\sin\omega_c t \qquad (2)$$

where $M(t)$ is the Hilbert transform of $M(t)$. The resulting single-sideband signal as a function of frequency and its spectrum showing the upper sideband only together with the carrier signal at $f_c$ are shown in FIG. 2*c*.

The envelope of the double-sideband signal is simply $$A(t)=|k+M(t)| \qquad (3)$$

However the envelope of a single-sideband signal is given by $$A(t)=|\sqrt{[k+M(t)]^2+[\hat{M}(t)]^2}| \qquad (4)$$

which is, by definition, also the envelope of the modulation information $[k+M(t)]$. Thus the envelope of the single-sideband signal represents a distortion of the modulation information. The degree of distortion depends both on $k$, the magnitude of the carrier wave, and on the wave form of the modulating or message signal $M(t)$. For $k=0$ (suppressed carrier) the envelope represents a serious distortion of the message wave. However, if $k$ is greater than the peak amplitude of the message the distortion is considerably reduced. This is the ordinary practice followed in full carrier transmission of SSB signals. The distortion of the message signal is apparent in the envelope of the full carrier SSB signal shown in FIG. 2*c*.

Figure 3:
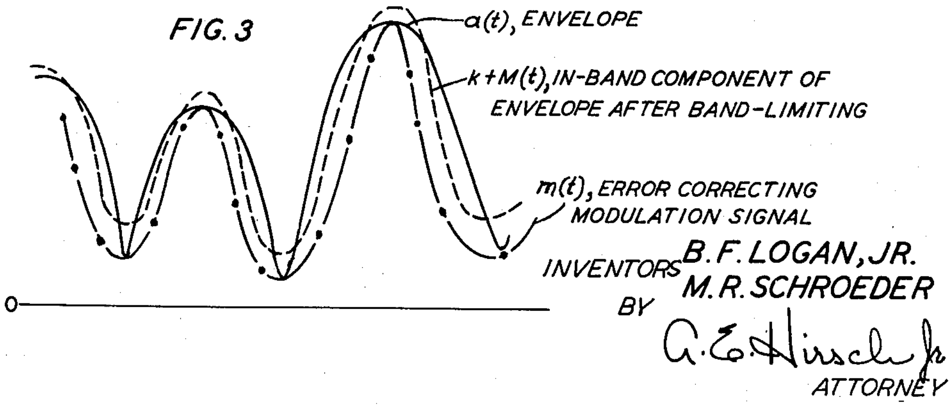
FIG. 3 is a series of wave forms illustrating the relationship between a message wave and the shaped modulating signal developed in accordance with the present invention.

To permit envelope detection of the single-sideband signal of FIG. 2*c* in a fashion to relegate distortion components to a band of frequencies that lie outside of the pass-band of the message signal $M(t)$, it is in accordance with the present invention to generate a single-sideband signal in the conventional way but to utilize a band-limited modulating signal $m(t)$ in place of the normally used modulating signal $[k+M(t)]$. This signal is selected to have an envelope $a(t)$ which, after suitable filtering to remove high frequency distortion components, yields the desired output, namely $[k+M(t)]$. The shaped modulation signal $m(t)$ is related to the various signals heretofore discussed as depicted graphically in FIG. 3.

It has been found in practice that the required modulation signal $m(t)$ can be obtained with a controlled degree of precision by iterative techniques. Generally speaking, the greater the number of iterations of the shaping apparatus the closer will be the modulating signal wave form $m(t)$ to the one required for yielding a distortionless message signal $M(t)$ at the receiver terminal. It has been found that two iterations are sufficient to provide an error correcting modulation signal $m(t)$ that yields at the receiver terminal a replica of the message signal of broadcast quality; one that may be used both for speech and high quality program transmission. For the satisfactory recovery of high speed data signals, three or more iterations are frequently required.

Figure 4:
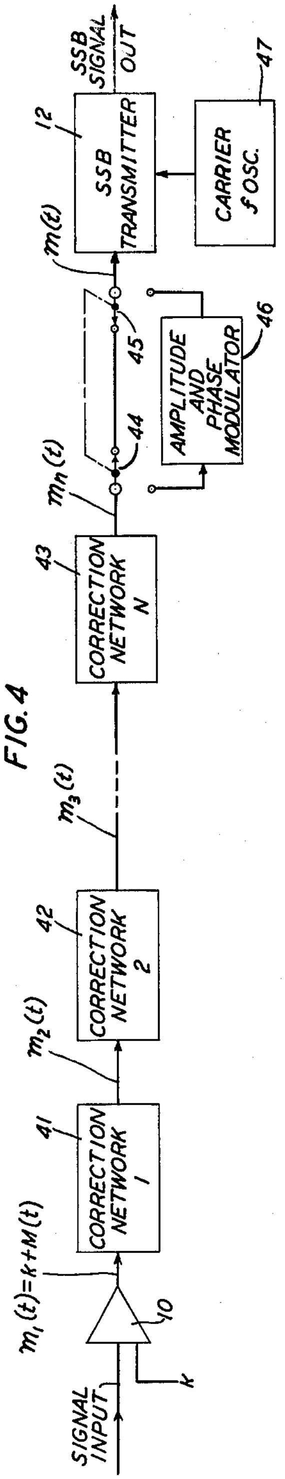
FIG. 4 is a simplified block schematic diagram of a single-sideband transmission system in which the required modulation signal is produced by means of an iterative network.

Turning now to the apparatus by which the mathematical relations set forth above are turned to account, FIG. 4 illustrates, in simple block diagram form, iterative apparatus suitable for generating modulation signal $m(t)$. An input signal, for example, a message signal, $M(t)$, is added to a constant voltage $k$, to provide the direct current component common to an AM modulated signal, in amplifier 10, and applied to a series of correction networks, 41, 42, . . . 43, that produce, after a sufficient number of iterations, a band-limited signal $m(t)$ whose envelope, after band-limiting, is a replica of the input signal. In one embodiment of the invention (FIG. 5) the correction networks shape the input signal to the required form without further processing so that the output of the last correction network 43 may be passed by way of switches 44 and 45 directly to conventional SSB transmitter 12. In another embodiment (FIG. 6), the correction networks yield a signal whose square is for all practical purposes band-limited. The fact that the square envelope is band-limited to W insures that an SSB signal of bandwidth W can be developed that has the required envelope. Accordingly, the envelope signal is passed by way of switches 44 and 45 through auxiliary apparatus 46 wherein a band-limited modulation signal $m(t)$ is produced which has an envelope that agrees with the input signal.

To establish the nature of the required modulation signal $m(t)$ it must be recalled that the single-sideband signal $$F(t)=m(t)\cos\omega t-\hat{m}(t)\sin\omega t \qquad (5)$$

is compatible with linear envelope detectors employed in amplitude modulation systems provided that $$|\sqrt{[m(t)]^2+[\hat{m}(t)]^2}|-k+m(t)+h(t) \qquad (6)$$

where $h(t)$ contains only components of frequency greater than W, the bandwidth of the message $M(t)$. A suitable first approximation to the required modulation signal $m(t)$ is $$m_1(t)=k+M(t) \qquad (7)$$

The envelope of the signal is $$a_1(t)=\sqrt{[k+M(t)]^2+[\hat{M}(t)]^2}=k+M(t)+O\left[\frac{M^2+\hat{M}^2}{k}\right] \qquad (8)$$

where $O(\theta)$ represents terms of order $x$. The band-limited envelope may be written $$B[a_1(t)]=k+M(t)+e_1(t) \qquad (9)$$

where $e_1(t)$ represents "in-band" error. This error may be reduced, provided that $k$ is sufficiently large, by taking as a second approximation to the modulation signal $$m_2(t)=m_1(t)-e_1(t) \qquad (10)$$

or in general by taking as the $n$th approximation $$m_n(t)=m_{n-1}(t)-e_{n-1}(t) \qquad (11)$$

where $e_{n-1}(t)$ represents the "in band" error, that is, the distortion component remaining in the envelope $a_{n-1}(t)$ after band-limiting. The iteration may be continued until the error is as small as desired.

Figure 5:
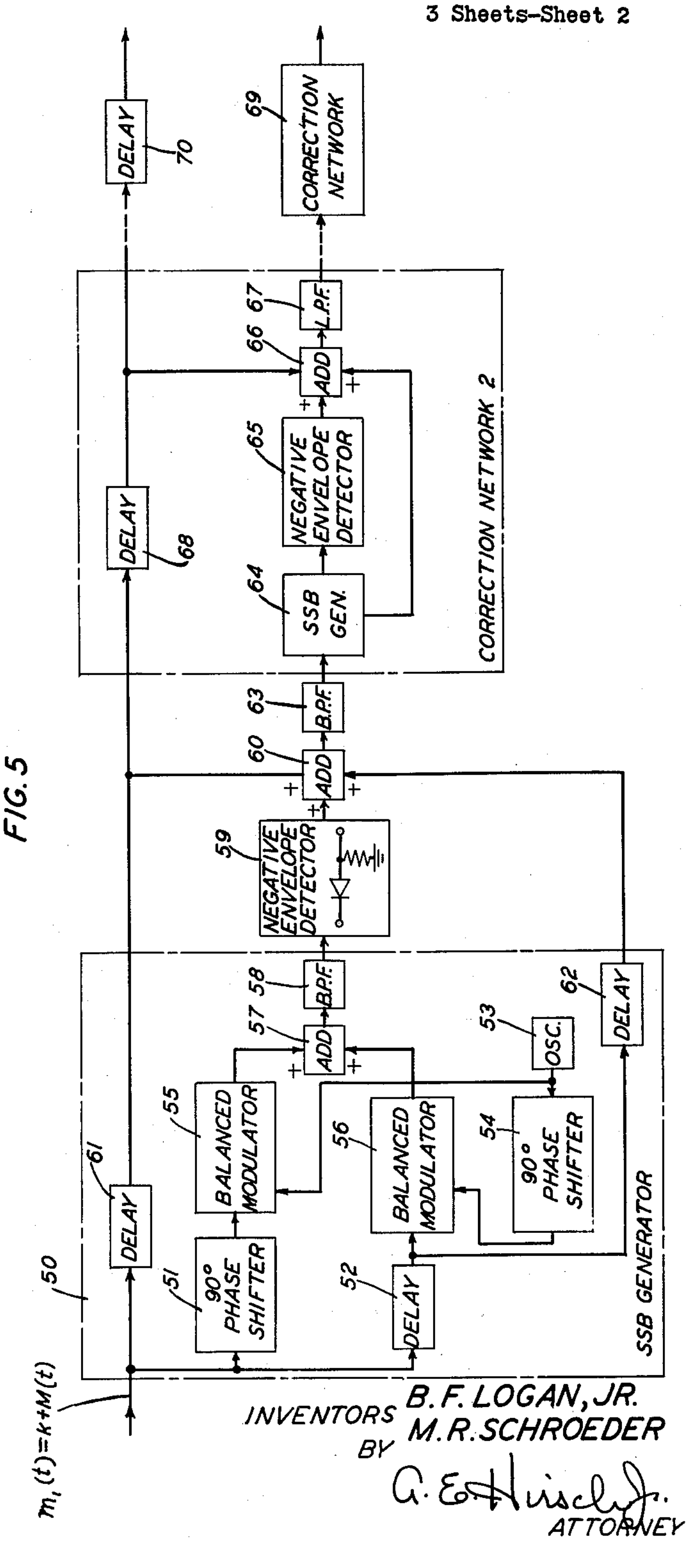
FIG. 5 is a detailed block schematic diagram that illustrates in more detail one manner of implementing the system of FIG. 4 in accordance with the invention.

In the apparatus of FIG. 5 the message signal $M(t)$ plus a direct current component $k$ (or in general a previously derived approximation $m_1(t)$) is supplied to a conventional SSB generator 50. Any standard method of generating the SSB signal may be used provided that the associated filters have linear phase characteristics. Numerous generators are well known in the art that satisfy these requirements. The phase-shift method of single-sideband signal generation is shown by way of example. SSB generator 50 comprises a 90 degree phase-shift network 51 for shifting the phase of one of two identical components of the applied signal $m_1(t)$ by 90 degrees. The other, a direct component of the input signal, is passed through delay element 52 to compensate for the phase delay encountered by the signal in phase shifter 51. The output of an oscillator 53, whose frequency is substantially greater than the bandwidth W of the message signal $M(t)$, is separated into two components having a 90 degree phase difference through the action of phase shifter 54. One carrier and one message signal component are combined in each of two separate balanced modulators 55 and 56. In the usual fashion the balanced modulators are arranged to suppress the carrier waves from oscillator 53 and to adjust the relative phases of the two sidebands supplied to adder 57 such that one sideband is balanced out and the other is accentuated in the combined output of the adder. A band-pass filter 58 centered about the carrier frequency may be required to remove undesirable products introduced by imperfections in the balanced modulators.

As in normal AM detection the modulating signal is recovered by applying the signal from filter 58 to an envelope detector 59 that comprises, for example, a half-wave rectifier. Preferably detector 59 is arranged to yield the negative envelope of the signal. The detected output follows the envelope variations of the signal $m_1(t)$ but also contains frequencies situated about the harmonics of the oscillator frequency. These are subsequently removed by passing the signal through a low-pass filter. The envelope is subtracted from the input signal $m_1(t)$ which is, of course, equal to $k+M(t)$, by adding the negative envelope to $m_1(t)$ in conventional adding network 60. Alternatively, a subtractor may be utilized to subtract a positive detected envelope from the input signal. In either case it is necessary to delay the input signal, as for example, by passing it through delay network 61, to compensate for the delay inherent in the SSB generator. The difference represents the negative error $e_1(t)$ between the input signal and the signal resulting from linear detection of the envelope of an SSB signal modulated with the input signal. It includes, in addition, certain high frequency distortion components, which are subsequently removed, e.g., by a low-pass filter.

A second approximation $m_2(t)$ to the required error correcting modulation signal $m(t)$ (the input signal $m_1(t)$ constitutes the first approximation in this analysis), is obtained by subtracting the error signal $e_1(t)$ from the previous approximation to the modulation signal. In this case the error is subtracted from the first approximation $m_1(t)$. Conveniently this is done by adding the negative error signal in adder 60 to the previous approximation which is available from the SSB generator 50 via delay element 62. Delay element 62 is provided to compensate for the delay associated with the band-pass filter 58, if used. If the aforementioned subtractor is employed to obtain error signal $e_1(t)$ a separate adder must, of course, be employed. Finally, the resulting difference signal is band-limited with a linear-phase, low-pass filter 63, whose cut-off frequency is equal to W, to obtain the next approximation $m_2(t)$ to the desired modulation signal $m(t)$.

The signal $m_2(t)$ is used to generate a new SSB signal in apparatus 64 which apparatus may be identical to SSB generator 50. Envelope detector 65 supplies the negative envelope of the SSB signal which is combined in adder 66 with the input signal $m_1(t)$ to produce a second error signal $e_2(t)$, which is in turn subtracted from the first modulation signal approximation $m_2(t)$ to produce at the output of low-pass filter 67 a new approximation $m_3(t)$ to the required modulating signal. Delay line 68 provides the necessary time equalization. This sequence of operations is repeated as often as desired eventually to produce a band-limited modulating signal $m(t)$ at the output of correction network 69 (identical to those previously described). It is used to modulate a conventional signle-sideband transmitter.

If a sufficient number of iterations are employed, an error correcting modulation signal $m(t)$ is thus produced with the correct shape to modulate a carrier with one sideband whose detected envelope is a virtually undistorted version of the original message signal. Although the envelope signal is not band-limited, distortion components appear only in the out-of-band frequencies. These are easily removed by filtering the detected signal in an AM receiver.

It is in accordance with another embodiment of the present invention to turn to account the relationship that exists between a signal of bandwidth W and the square of its envelope. The squared envelope contains frequency components only in the band (O, W) i.e., it is band-limited. Conversely, any non-negative signal band-limited to W can always be expressed as the square of the envelope of another signal of bandwidth W, e.g., an SSB signal; that is, one can always find mathematically a signal of bandwidth W having a given non-negative envelope, provided that the square of the envelope is band-limited to W. It is in accordance with the invention to develop an envelope signal agreeing, in the band (O, W), with an input message signal and containing outside of the band the necessary high frequency components to make the squared envelope signal band-limited to W. A modulation signal band-limited to W is thereupon derived which has the previously developed envelope. The modulation signal is used to generate an SSB signal of bandwidth W having the same envelope. Alternatively, the SSB signal may be derived directly from the envelope signal. At the receiver the desired information is obtained by band-limiting the envelope of the SSB signal to remove the high frequency distortion components.

As shown hereinabove, the desired envelope of the SSB signal must contain, in addition to the band-limited information signal, certain high frequency components in order for the square of the envelope to be band-limited to the same frequency range as the information. Accordingly, the desired envelope $a(t)$ may be written $$a(t)=k+M(t)+h(t) \tag{12}$$

where $h(t)$ represents the required high frequency components, i.e., $h(t)$ is a "high-pass" signal containing only components of frequency greater than W, the highest frequency component in the message signal $M(t)$. In order to evaluate $h(t)$ a first approximation to $a(t)$ is taken to be $$a_1(t)=k+M(t) \tag{13}$$

However, $a_1^2(t)$ will not be band-limited to W. This may be expressed by writing $$a_1^2(t)=B[a_1^2(t)]+h_1(t) \tag{14}$$

where B indicates the operation of band-limiting and $h_1(t)$ represents here unwanted high frequency components. These components can be largely canceled, provided that $k$ is sufficiently large, by taking as a second approximation $$a_2(t)=k+m(t)-\frac{1}{2k}h_1(t) \tag{15}$$

With this approximation $$a_2^2(t)=B[a_1^2(t)]+h_1(t)-h_1(t)-\frac{M(t)h_1(t)}{k}+\frac{h_1^2(t)}{4k^2} \tag{16}$$

and the $h_1$ terms in $a_2^2(t)$ thus cancel. The remaining out-of-band components in $a_2^2(t)$ consist of components of aggregate bandwidth 4W but of less total energy (of order $1/k$) than the out-of-band components in $a_1^2(t)$.

In general the *n*th aproximation becomes $$a_n(t)=a_{n-1}(t)-\frac{1}{2k}h_{n-1}(t) \quad (17)$$

where $h_{n-1}(t)$ represents the frequency components of $a_{n-1}^2(t)$ that fall above the band W. Notice that successive approximations are obtained by appending only high frequency components to the previous approximations. Thus the only low frequency components appearing in any approximation are the desired message components introduced in the first approximation. The iteration may be performed until any desired degree of accuracy is obtained in specifying the required high frequency signal components. It should be noted, however, that $k$, the carrier level, must be sufficiently large to insure that $$a_n(t)\geqslant 0 \quad (18)$$

since the envelope of the signal cannot be negative. Finally, if so few iterations are used that $a_n^2(t)$ is not sufficiently band-limited, then to insure that the square of the envelope is actually band-limited the required envelope is taken to be $$a_n(t)=\sqrt{B[a_n^2(t)]} \quad (19)$$

i.e., the *n*th approximation to the envelope is squared and band-limited by filtering. By taking the square root of the filtered signal, the required envelope $a(t)$ is obtained. This expedient for obtaining a band-limited square envelope will introduce some in-band distortion in the envelope $a(t)$. However, these distortion components will be an order less in magnitude than the high frequency components removed by filtering the squared signal $a_n^2(t)$.

Figure 6:
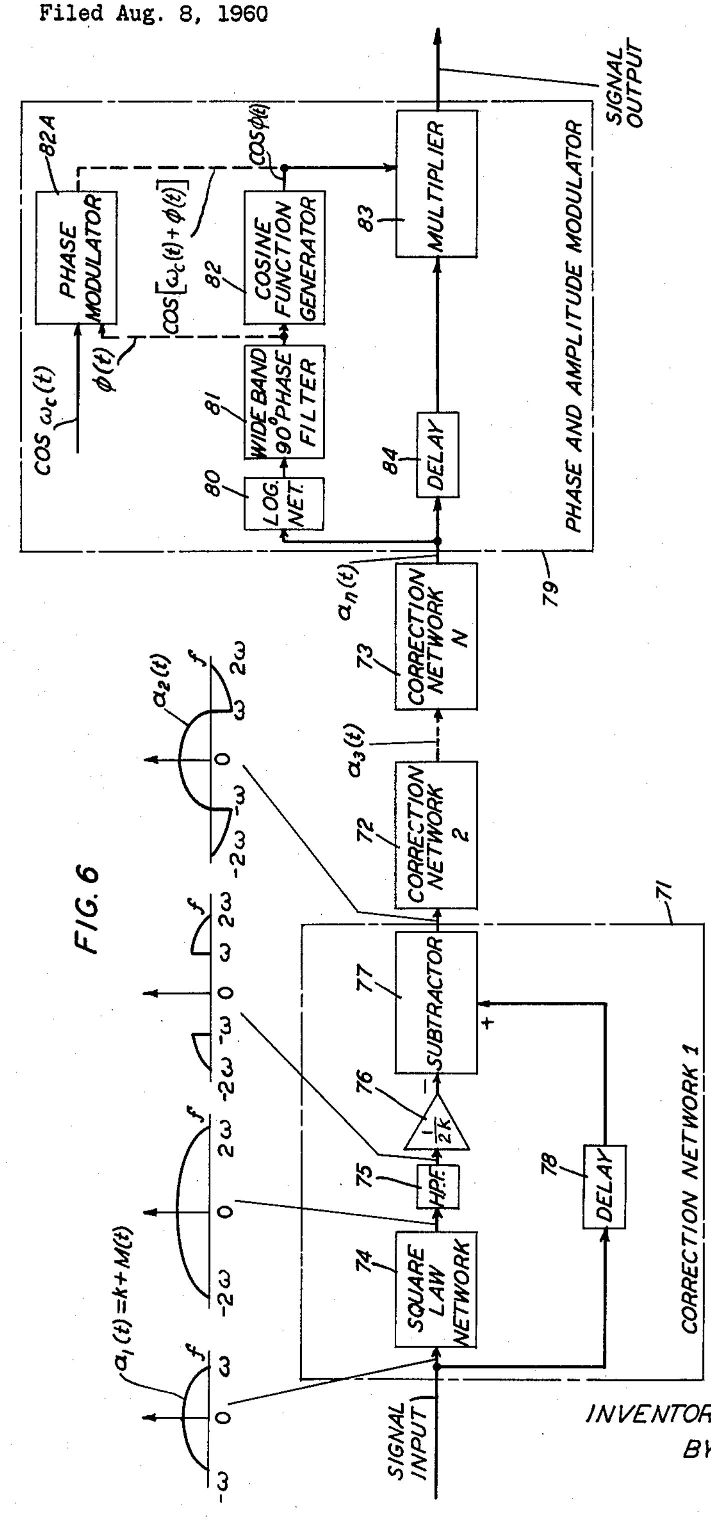
FIG. 6 is a detailed block schematic diagram that illustrates apparatus alternative to that of FIG. 5.

Apparatus for implementing the mathematical expressions given above is shown in FIG. 6. The input signal of bandwidth W is applied to a series of correction networks 71, 72 . . . 73 that append only high frequency components to the input signal and so obtain an envelope signal $a_n(t)$ with the property that $a_n^2(t)$ is substantially band-limited to W and which produces after suitable phase and amplitude modulation a compatible single-sideband signal. Only one of several identical correction networks is shown in detail. It comprises a square-law network 74 supplied with an input message signal for developing at its output a signal proportional to the square of its input. Networks of this general form are well known to those skilled in the art. The square of the applied signal, being of bandwidth 2W, is passed through high pass filter 75 (selected to have no phase distortion) to remove frequencies below W. The remaining high frequency components in the band between W and 2W are passed through amplifier 76 whose gain is selected to be $1/2k$. Out-of-band components are thus adjusted in magnitude in accordance with the relation set forth in Equation 15. The adjusted high frequency components are then subtracted in subtracting network 77 from the applied input signal $a_1(t)$. This signal, $a_1(t)$, is applied to subtractor 77 by way of delay line 78, proportioned suitably to compensate for the delay imparted to the signal by filter 75.

Figure 7:
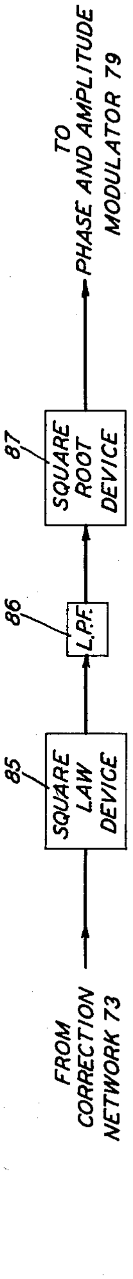
FIG. 7 is a block schematic diagram of apparatus that finds use in the system of FIG. 6.

The difference signal derived from subtractor 77 thus is a second approximation $a_2(t)$ to the desired envelope $a(t)$. It contains frequency components extending to 2W, which reduce the total energy of high frequency components in $a_2^2(t)$ to a level less than that of the high frequency components in $a_1^2(t)$. The second approximation is applied to correction network 72, identical in all respects with correction network 71 except for the parameters associated with the gain adjusting amplifier therein, to produce at its output a third approximation to $a(t)$, namely $a_3(t)$. The square of the third approximation signal contains less high frequency energy than the square of previous approximations. The iteration of these operations may be continued until the out-of-band distortion components are reduced to any desired energy level in the square of the last approximation $a_n(t)$. However, if the desired level is not achieved by iterations, limited in number by other considerations, the network of FIG. 7 may be inserted between the last correction network 73 and the phase and amplitude modulator 79. It operates, as previously described, to band-limit the squared envelope.

To obtain a single-sideband signal having a band-limited squared envelope, the error correcting modulating signal must be of the form $$m(t)=a(t)\cos\phi(t) \quad (20)$$

where $\phi(t)$ is the Hilbert transform of $\log_e a(t)$, Accordingly, the envelope signal $a_n(t)$ derived from the network 73 is passed through a network 79 containing elements for generating the modulating signal of the required form. It includes two parallel paths, one including in series a logarithm network 80, i.e., a nonlinear device whose output is proportional to the logarithm of the input, a wide-band ninety degree phase-filter 81, a cosine function generator 82, and a multiplier 83. The other path passes the applied signal $a_n(t)$ to the multiplier 83 through a delay device 84 to compensate for the delay associated with phase-filter 81.

Phase-filter 81 may be of any desired construction. In essence, it derives from the applied signal the Hilbert transform or quadrature function of the applied signal. A wide-band circuit is required since $\log_e a(t)$ is not band-limited. The use of a ninety degree phase-filter to obtain the Hilbert transform of a signal is based upon the well-known quadrature relationship between a function and its Hilbert transform. A proof of this relationship is found in S. Goldman, Information Theory, page 332 (1953). Since functions that are in quadrature with each other differ in phase by ninety degrees, any one of a variety of phase-filters may be used for obtaining the Hilbert transform, or quadrature function, of the signal $a_n(t)$; for example, a transversal filter of the type described in H. L. Barney Patent 2,451,465, or a wide-band phase splitter of the type described in R. C. Cheek Patent 2,727,141 may be used. In addition, an all-pass filter network for obtaining the Hilbert transform of a real waveform is found in an application of M.R. Schroeder, Serial No. 827,814, filed July 17, 1959.

The phase function $\phi(t)$, obtained by taking the Hilbert transform of $\log_e a_n(t)$, is subsequently passed through cosine function generator 82, designed in accordance with well known engineering principles, to provide a signal proportional to the cosine of the applied signal. This signal, $\cos\phi(t)$, is applied to one input of multiplier 83 and $a_n(t)$ from delay element 84 is applied to the other. A product signal proportional to $a_n(t)\cos\phi(t)$ is consequently produced that is the required error correcting modulating signal $m(t)$. It may be used as described hereinbefore to generate a full carrier single-sideband signal that is compatible with linear envelope detectors employed in typical AM receivers.

As an alternative, the compatible single-sideband signal may be generated directly by replacing the cosine function generator with a conventional phase modulator, 82A, wherein the phase of a carrier wave $\cos w_c t$ is varied in accordance with the input $\phi(t)$. Then the input to the amplitude modulator or multiplier 83 becomes $$\cos[w_c t+\phi(t)]$$

The output of the amplitude modulator then is the SSB signal $F(t)=a(t)\cos[w_c t+\phi(t)]$ which is equivalent to the signal $F(t)=m(t)\cos w_c t-m(t)\sin w_c t$.

It is to be understood that the above-described arrangements are merely illustrative of applications of the principles of the invention. Numerous other arrangements may be devised by those skilled in the art without departing from the spirit and scope of the invention.

What is claimed is:

1. In combination, apparatus for developing an error correcting modulating signal for a single-sideband generator comprising a message signal, means for producing a first single-sideband signal modulated in accordance with said message signal, means for generating a signal proportional to the envelope of said first single-sideband signal, means for subtracting said envelope signal from said message signal to produce a first error signal, means for algebraically combining said error signal with said envelope signal to produce a first modulating signal for producing in said single-sideband generator a signal that yields after envelope detection and band-limiting substantially a replica of said message signal, means for band-limiting said first modulating signal, and means for utilizing said modulating signal to produce a carrier signal and one modulated sideband signal for transmission.

2. Apparatus as defined in claim 1 in combination with means for producing a second single-sideband signal modulated in accordance with said first modulating signal, means for generating a signal proportional to the envelope of said second single-sideband signal, means for subtracting said envelope signal from said message signal to produce a second error signal, means for algebraically combining said second error signal with said first modulating signal to produce a second modulating signal for producing in said single-sideband generator a signal that yields after envelope detection and band-limiting a replica of said message signal, and means for band-limiting said second modulating signal.

3. Apparatus for developing a modulating signal for a single-sideband generator comprising an input terminal for message signals, a single-sideband generator, a plurality of interconnected correction networks coupling said input terminal to said generator for shaping an applied message signal to produce a band-limited predistorted modulating signal, said predistorted modulating signal being shaped to assure that distortions of said applied message signal accruing from subsequent envelope detection of a single-sideband signal developed from said modulating signal are relegated to frequencies outside the pass-band of said message signal, said input terminal being connected to the input of the first of said correction networks, said modulator being connected to the output of the last of said correction networks, said correction networks each comprising means for generating a single-sideband signal modulated in accordance with the signal applied thereto, means for generating a signal proportional to the envelope of said single-sideband signal, means for subtracting said envelope signal from the message signal applied to said input terminal to produce an error signal, and means for algebraically combining said error signal with said locally developed envelope signal to produce a band-limited modulating signal for said single-sideband generator.

4. Apparatus for developing a modulating signal for a single-sideband generator comprising: a plurality of networks connected in tandem for developing from an input message signal an envelope signal whose square is band-limited to the frequency band of the message signal; each of said networks comprising means for generating a signal proportional to the square of an input signal, means for extracting from said squared input signal frequency components in excess of the bandwidth of said message signal, means for adjusting the magnitude of said extracted components in accordance with a preselected factor, and means for subtracting said adjusted components from said input signal to produce an envelope signal $a_n(t)$ containing said message signal and selected out-of-band components to yield a squared envelope $a_n^2(t)$ band-limited to the frequency range of said message signal; and modulator means for developing from said envelope signal $a_n(t)$ an error correcting modulating signal $m(t)$ band-limited to the frequency range of said message signal.

5. Apparatus as defined in claim 4 wherein said modulator means comprises nonlinear network means supplied with said envelope signal $a_n(t)$ for producing an output signal proportional to the logarithm of $a_n(t)$, wide-band filter means for developing a signal proportional to the quadrature function of log $a_n(t)$, cosine function generator means for developing a signal proportional to the cosine of said quadrature function signal, and means for obtaining a signal proportional to the product of said signal $a_n(t)$ and the cosine of said quadrature function signal.

6. In combination with the apparatus of claim 4 means supplied with said envelope signal $a_n(t)$ for producing a signal proportional to $a_n^2(t)$, means for limiting the bandwidth of $a_n^2(t)$ to a preselected width, means for generating a signal proportional to the square root of $a_n(t)$, and means for utilizing said square root signal $a_n(t)$ for developing an error correcting modulating signal $m(t)$.

7. Apparatus as defined in claim 4 wherein said modulator means comprises nonlinear network means supplied with said signal $a_n(t)$ for producing an output signal proportional to the logarithm of $a_n(t)$, wide-band filter means for developing a signal proportional to the quadrature function of log $a_n(t)$, and phase- modulator means supplied with said quadrature function signal and with a carrier wave signal for producing a single-sideband signal that yields after linear envelope detection and band-limiting a replica of said applied message signal.

8. Apparatus for developing a signal representative of the envelope of a single-sideband signal of bandwith W that comprises a plurality of networks connected in tandem for developing from an input message signal an envelope signal whose square is band-limited to the frequency range of the message signal, each of said networks comprising means for generating a signal proportional to the square of said input signal, means for extracting from said squared input signal frequency components in excess of the bandwith of said message signal, means for adjusting the magnitude of said extracted components in accordance with a preselected factor, and means for substracting said adjusted components from said input signal to produce an envelope signal containing said message signal and selected out-of-band components to yield a squared envelope band-limited to the frequency range of said message signal.

References Cited in the file of this patent

UNITED STATES PATENTS

| | | |
|---|---|---|
| 2,777,900 | Cowan | Jan. 15, 1957 |
| 2,849,537 | Eglin | Aug. 26, 1958 |